Patented Jan. 28, 1936

2,028,765

UNITED STATES PATENT OFFICE 2,028,765

SYNTHESIS OF FORMIC ACID

Henry Dreyfus, London, England

No Drawing. Original application October 28, 1932, Serial No. 640,004. Divided and this application November 1, 1933, Serial No. 696,185. In Great Britain December 1, 1931

12 Claims. (Cl. 260—114)

This invention relates to the synthesis of formic acid.

This application is a division of application Serial No. 640,004 filed October 28, 1932.

I have found that formic acid can readily be prepared by subjecting carbon monoxide to reaction with water in presence of copper sulphate. If desired the copper sulphate may be employed in association with sulphuric acid and also with substances capable of absorbing carbon monoxide, such, for instance, as cuprous chloride, silver nitrate and the like.

Advantageously the reaction may be performed at high or relatively high temperatures, such, for instance, as between about 100° and 350° C., and especially between about 150° and 250° C. Super-atmospheric pressures, e. g. up to about 20 atmospheres or more, may if desired be employed to accelerate the reaction.

The reaction of the invention may be effected in any convenient way. Thus, for example, mixtures of carbon monoxide and steam may be passed, under normal or super-atmospheric pressure, into or through heated solutions of copper sulphate with or without sulphuric acid and/or substances capable of absorbing carbon monoxide, or they may be passed over or otherwise in contact with copper sulphate in the solid state, if desired in admixture with cuprous chloride or silver nitrate.

The mixture of carbon monoxide and steam may contain the carbon monoxide in any relative proportion. Preferably, however, the mixtures contain substantially one molecule of carbon monoxide to each molecule of steam. If desired, when the copper sulphate is employed in aqueous solution the carbon monoxide may be used without admixture with steam.

For the purposes of the invention I may employ carbon monoxide in pure or substantially pure form or in the form of industrial or other gas mixtures containing carbon monoxide, e. g. water gas, power gas or the like. Preferably pure carbon monoxide or gaseous mixtures containing high or relatively high proportions of carbon monoxide are used, e. g. mixtures containing upwards of about 80% of carbon monoxide. Preferably gases substantially free from sulphur compounds or other catalyst poisons are employed.

It is to be understood that by the term "water" I mean water either in the liquid or in the vapour phase.

What I claim and desire to secure by Letters Patent is:—

1. The process of manufacturing formic acid comprising reacting carbon monoxide with water at an elevated temperature in the presence of copper sulphate.

2. The process of manufacturing formic acid comprising reacting carbon monoxide with water at an elevated temperature in the presence of copper sulphate and sulphuric acid.

3. The process of manufacturing formic acid comprising reacting carbon monoxide with water at an elevated temperature in the presence of copper sulphate and a substance capable of absorbing carbon monoxide.

4. The process of manufacturing formic acid comprising reacting carbon monoxide with water at an elevated temperature in the presence of copper sulphate and sulphuric acid and a substance capable of absorbing carbon monoxide.

5. The process of manufacturing formic acid comprising reacting carbon monoxide with water at an elevated temperature in the presence of an aqueous solution of copper sulphate containing a substance capable of absorbing carbon monoxide.

6. The process of manufacturing formic acid comprising reacting carbon monoxide with water at an elevated temperature in the presence of an aqueous solution of copper sulphate and sulphuric acid containing a substance capable of absorbing carbon monoxide.

7. The process of manufacturing formic acid comprising reacting carbon monoxide and water in the presence of copper sulphate at a temperature between 100° and 350° C.

8. The process of manufacturing formic acid comprising reacting carbon monoxide with water in the presence of an aqueous solution of copper sulphate at a temperature between 100° and 350° C. and under super-atmospheric pressure.

9. The process of manufacturing formic acid comprising reacting carbon monoxide with water in the presence of an aqueous solution of copper sulphate and sulphuric acid at a temperature between 100° and 350° C. and under super-atmospheric pressure.

10. The process of manufacturing formic acid comprising reacting carbon monoxide with water in the presence of copper sulphate and sulphuric acid and a substance capable of absorbing carbon monoxide at a temperature between 100° and 350° C. and under super-atmospheric pressure.

11. The process of manufacturing formic acid, comprising reacting carbon monoxide and water in the presence of copper sulphate and sulphuric acid at a temperature between 100° and 350° C.

12. The process of manufacturing formic acid, comprising reacting carbon monoxide and water, in the presence of copper sulphate and a substance capable of absorbing carbon monoxide, at a temperature between 100° and 350° C.

HENRY DREYFUS.